United States Patent
Morin et al.

(10) Patent No.: US 12,462,477 B2
(45) Date of Patent: Nov. 4, 2025

(54) METHOD AND SYSTEM FOR SCANNING A PART BY PERFORMING COMPENSATION OR TRANSFORMATION OF SCANNED PART DATA

(71) Applicant: PRATT & WHITNEY CANADA CORP., Longueuil (CA)

(72) Inventors: Philippe Morin, Beloeil (CA); Mizanur Rahman, Saint-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 258 days.

(21) Appl. No.: 18/312,028

(22) Filed: May 4, 2023

(65) Prior Publication Data
US 2024/0371090 A1   Nov. 7, 2024

(51) Int. Cl.
G06T 17/00    (2006.01)

(52) U.S. Cl.
CPC .... G06T 17/00 (2013.01); *G06T 2207/10028* (2013.01); *G06T 2207/30204* (2013.01)

(58) Field of Classification Search
CPC ........... G06T 17/00; G06T 2207/10028; G06T 2207/30204; G01B 21/045; G01B 21/042; G01B 11/24
See application file for complete search history.

(56) References Cited

U.S. PATENT DOCUMENTS

| | | | |
|---|---|---|---|
| 7,905,031 B1 * | 3/2011 | Paulino | G01B 21/04 33/553 |
| 8,738,342 B2 | 5/2014 | Lind et al. | |
| 9,175,950 B2 | 11/2015 | Collis et al. | |
| 9,983,566 B2 | 5/2018 | Gross et al. | |
| 10,690,491 B1 | 6/2020 | Perrett | |
| 11,144,037 B2 | 10/2021 | Borowicz | |
| 2017/0165732 A1 * | 6/2017 | Gross | G01B 21/20 |
| 2020/0318954 A1 | 10/2020 | Wolke | |
| 2021/0405622 A1 | 12/2021 | Borowicz | |

(Continued)

FOREIGN PATENT DOCUMENTS

| | | |
|---|---|---|
| CN | 110553584 | 12/2019 |
| CN | 215930812 | 3/2022 |

(Continued)

OTHER PUBLICATIONS

Extended European Search Report dated Oct. 17, 2024, EP Application No. 24173678.4.

*Primary Examiner* — Maurice L. McDowell, Jr.
(74) *Attorney, Agent, or Firm* — NORTON ROSE FULBRIGHT CANADA LLP (57) ABSTRACT

A method of scanning a part, for example of an aircraft engine, using a three-dimensional (3D) scanning system includes positioning a scanning fixture adjacent to the part within a field of view of a sensor of the 3D scanning system, the scanning fixture having a plurality of markers thereon, and maintaining the scanning fixture in a fixed position relative to the part. Scanned part data and spatial coordinates of the plurality of markers of the scanning fixture is acquired, by the 3D scanning system. The spatial coordinates of the markers providing digitization reference points. A compensation or transformation of the scanned part data is performed, using the digitization reference points, to generate compensated part data.

19 Claims, 7 Drawing Sheets

(56) References Cited

U.S. PATENT DOCUMENTS

2023/0400296 A1* 12/2023 Adams ..................... G06T 7/73
2024/0255415 A1* 8/2024 Giera ..................... G01B 11/25

FOREIGN PATENT DOCUMENTS

| DE | 10 2013 012890 | | 9/2014 | |
|----|----------------|---|--------|---|
| DE | 10 2019 111499 | | 11/2020 | |
| KR | 20050052979 | | 6/2005 | |
| KR | 2020052084 A | * | 5/2020 | ........... H04N 13/128 |
| WO | 2015/140183 | | 9/2015 | |

* cited by examiner

METHOD AND SYSTEM FOR SCANNING A PART BY PERFORMING COMPENSATION OR TRANSFORMATION OF SCANNED PART DATA

TECHNICAL FIELD

The present disclosure relates generally to relates generally to systems and methods of scanning manufactured parts, and more particularly to methods and fixtures used for three-dimensional scanning of aircraft engine parts for the purposes of inspection or manufacture.

BACKGROUND

Manufactured parts used in aircraft engines may be scanned, using a three-dimensional (3D) scanning system for example, in order to measure and/or inspect surfaces of the parts and ensure geometric conformity within acceptable tolerances.

Laser line scans are sometimes used for this purpose, however typical laser line scanning systems require utmost precision of the robot that controls the scanner's position and orientation relative to the part being scanned. Scanning systems which employ topometric sensors can be less susceptible to this issue, but require reference targets to function. These reference markers, or targets, must be placed on the part itself and/or on a table or other surface in close proximity to the part. This can be very time consuming, given that these markers need to be applied one-by-one on the part prior to scanning and subsequently removed after scanning, and then this process needs to be repeated for the next part to be scanned. Improvements are therefore sought.

SUMMARY

In accordance with one aspect, there is provided a method of scanning a part using a three-dimensional (3D) scanning system, the method comprising: positioning a scanning fixture adjacent to the part within a field of view of a sensor of the 3D scanning system, the scanning fixture having a plurality of markers thereon, and maintaining the scanning fixture in a fixed position relative to the part; and acquiring, by the 3D scanning system, scanned part data and spatial coordinates of the plurality of markers of the scanning fixture, the spatial coordinates of the markers providing digitization reference points; and performing a compensation or transformation of the scanned part data, using the digitization reference points, to generate compensated part data.

The method as defined above and described herein may further include one or more of the following features, in whole or in part, and in any combination.

In certain aspects, the method further includes generating a digital model of the part using the compensated part data.

In certain aspects, the acquiring further comprises scanning the part and the scanning fixture from two or more sensor locations.

In certain aspects, the method further includes displacing the scanning fixture from a first position to a second position located within a field of view of the sensor of the 3D scanning system, the scanning fixture being located adjacent the part in the second position.

In certain aspects, the scanning feature at least partially surrounds the part in the second position.

In certain aspects, the scanning fixture includes a frame defining an internal cavity, further comprising positioning the frame such that the part is located within the internal cavity when in the second position.

In certain aspects, the plurality of markers are located on multiple branches of a frame of the scanning fixture, the branches defining therewithin an internal cavity of scanning fixture, further comprising placing the frame over the part to position the part within the internal cavity.

In certain aspects, the method further includes, following the acquiring, displacing the scanning fixture away from an initial position of the scanning fixture relative the part, and removing the part from the field of view of the 3D scanning system.

In certain aspects, the method further includes placing another part within the field of view of the 3D scanning system and repositioning the scanning fixture in the initial position.

There is also provided a method of scanning a part of an aircraft engine using a three-dimensional (3D) scanning system, the method comprising: positioning the part at least partially within a scanning fixture, the scanning fixture having a plurality of markers thereon; scanning, with the 3D scanning system, the part to generate scanned part data; acquiring, by the 3D scanning system, spatial coordinates of the plurality of markers of the scanning fixture; performing a compensation or transformation of the scanned part data, using the spatial coordinates of the markers as digitization reference points, to generate compensated part data; and generating a digital model of the part using the compensated part data.

The method as defined above and described herein may further include one or more of the following features, in whole or in part, and in any combination.

In certain aspects, the scanning and the acquiring are performed simultaneously.

In certain aspects, the positioning the part further comprises displacing the scanning fixture and positioning the scanning fixture adjacent to the part within a field of view of a sensor of the 3D scanning system.

In certain aspects, the acquiring further comprises scanning the part and the scanning fixture from two or more sensor locations.

In certain aspects, the plurality of markers are located on multiple branches of a frame of the scanning fixture, the branches defining therewithin an internal cavity of scanning fixture, further comprising placing the frame over the part to position the part within the internal cavity There is further provided a three-dimensional (3D) scanning system for scanning a part, comprising: a sensor defining a field of view of the 3D scanning system; and a scanning fixture that is displaceable and sized to at least partially surround the part within the field of view, the scanning fixture including: a frame having a base, a center hub axially spaced apart from the base and defining a center axis of the scanning fixture, and a plurality of branches extending between the base and the center hub, the branches defining an internal cavity defined within the frame, the internal cavity being sized to receive the part; and a plurality of markers located on the frame, the markers being identified by the sensor to determine spatial coordinates of the markers.

The scanning feature as defined above and described herein may further include one or more of the following features, in whole or in part, and in any combination.

In certain aspects, a manipulation element is attached to the frame, the manipulation element permitting displacement of the scanning fixture.

In certain aspects, the markers are disposed on the branches of the frame facing an outward direction.

In certain aspects, the markers are substantially equally spaced apart along at least a portion the branches of the frame.

In certain aspects, the frame includes sub-branches extending transversely from the branches, the sub-branches disposed at an angle relative to a respective longitudinally extending branch.

In certain aspects, the markers are passive optical markers.

BRIEF DESCRIPTION OF THE DRAWINGS

Reference is now made to the accompanying figures in which.

DETAILED DESCRIPTION

Figure 1:
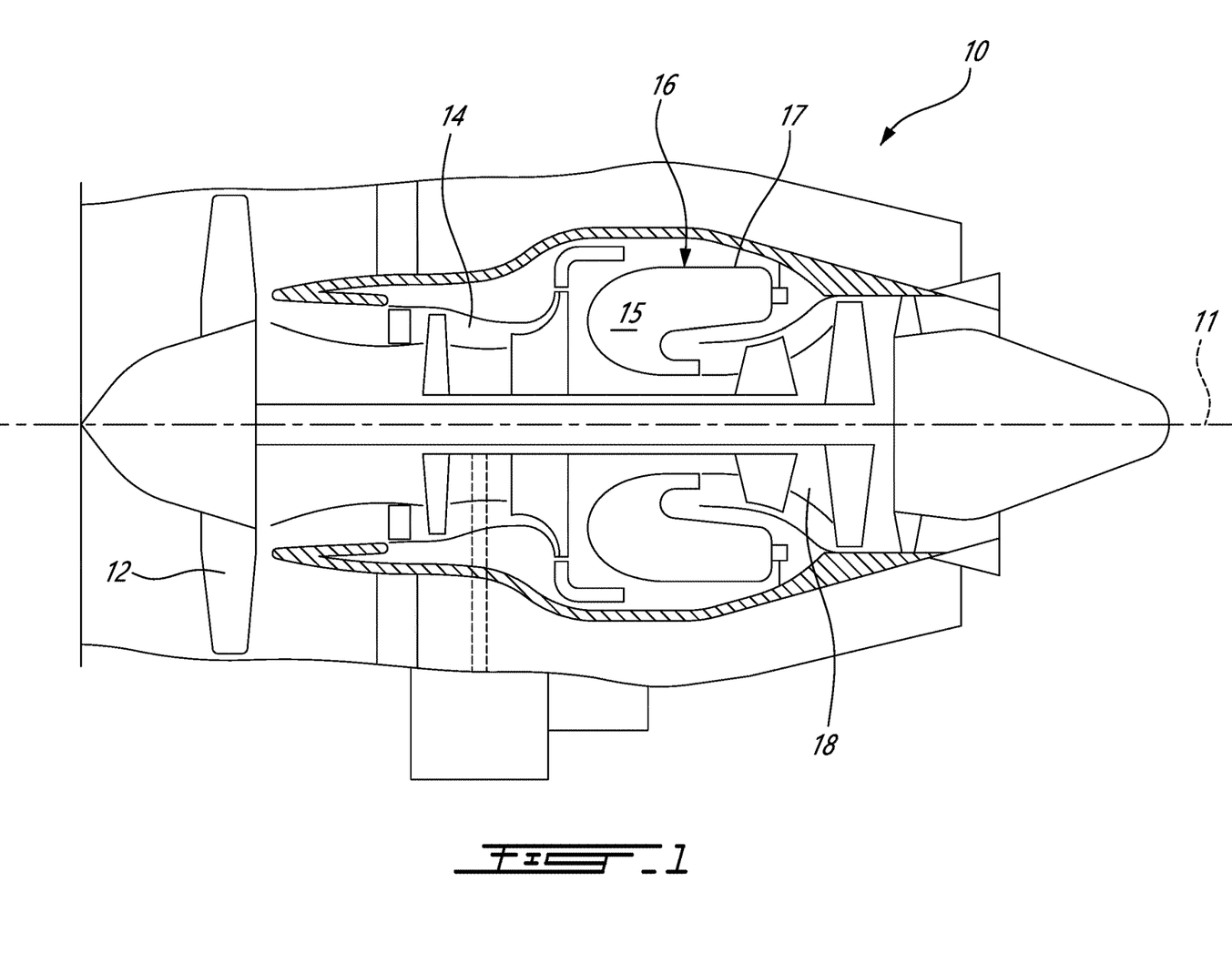
FIG. 1 is a schematic cross sectional view of an aircraft engine.

FIG. 1 illustrates an aircraft engine 10, and more particularly a gas turbine engine, of a type preferably provided for use in subsonic flight. The depicted aircraft engine (or simply "engine") 10 generally comprises, in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
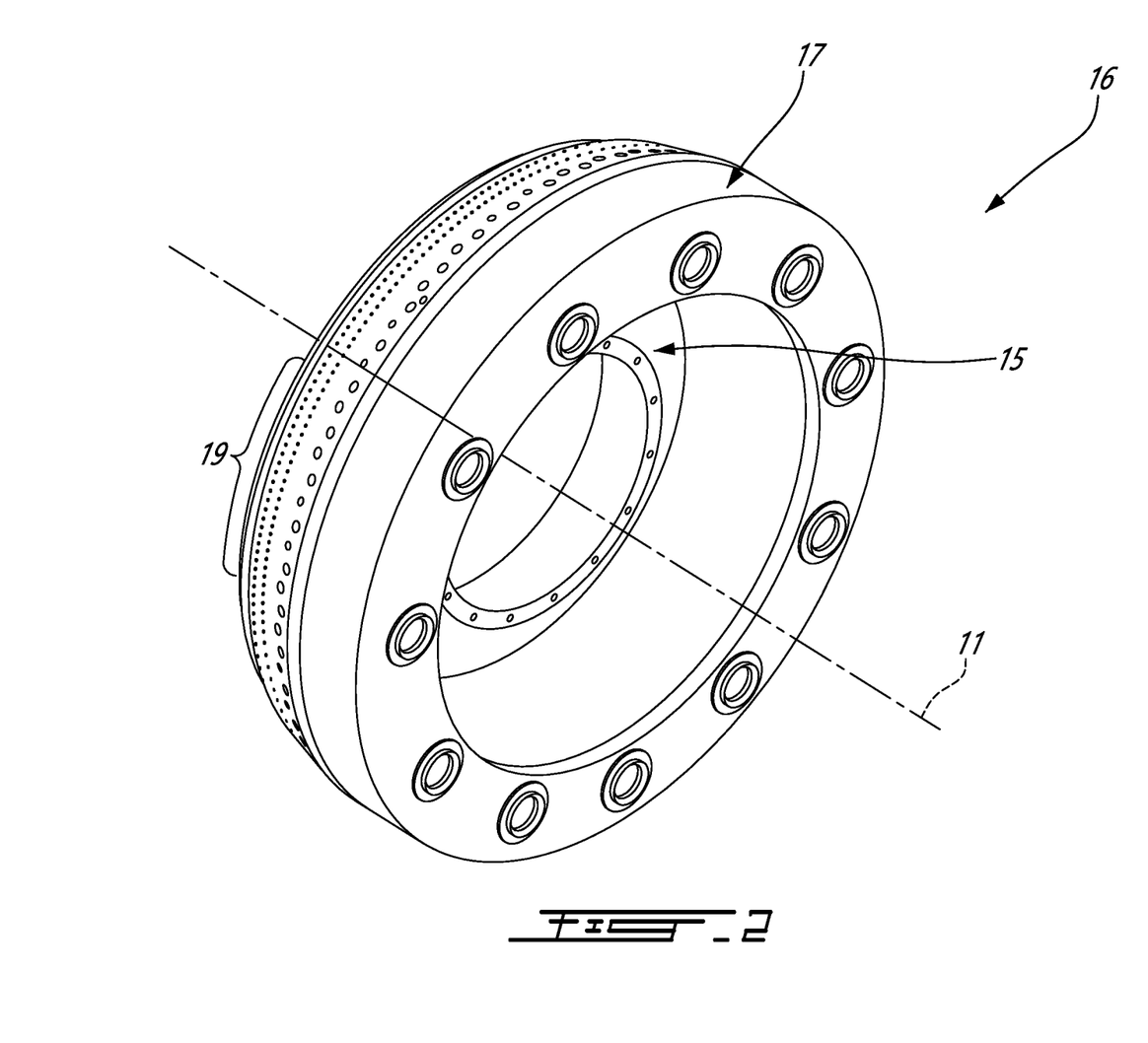
FIG. 2 is schematic perspective view of a combustor liner of the aircraft engine.

Referring also FIG. 2, the combustor 16 of the engine 10 may include a combustor liner 17, which defines therewithin an annular combustion chamber 15 of the engine 10. The combustor liner 17 is generally annular and extends circumferentially about the longitudinally extending engine axis 11. Although both straight-flow combustors and reverse-flow combustors may be used, the combustor 16 of the exemplary engine 10 is a reverse-flow combustor and thus the combustor liner 17 of FIG. 2 is a reverse flow liner.

Typically, but not always, such combustor liners 17 are formed of relatively thin sheet metal, and therefore local deformation of the part during manufacturing can sometimes occur. Additionally, because the combustor liner 17 is exposed to very high temperatures during operation of the engine 10, the combustor liner 17 requires significant cooling. Pressurized cooling air is introduced into the combustor, via a plurality of cooling apertures 19 formed in the walls of the combustor liner 17. Multiple types, sizes and patterns of cooling holes may be provided, as required. The cooling apertures 19 may for example include effusion cooling holes, impingement cooling holes, film cooling holes, and often a combination of all of these cooling holes in a particular configuration. Drilling or otherwise forming all of these cooling apertures 19 with the necessary precision is important to ensure proper functioning of the combustor and maintain desired efficiency and performance levels for the engine 10.

Such combustor liners 17 are therefore complex parts that must be manufactured with precision, within specific tolerances. After such combustion liners 17 are manufactured, they are routinely inspected to ensure that all dimensions, surfaces, holes, etc. of the part conform with acceptable manufacturing tolerances.

A number of the manufactured parts used within the engine 10 may undergo three-dimensional (3D) scanning for inspection purposes, after they have been produced. It is to be understood that the methods and systems described herein for inspecting parts may be used to inspect any manufactured part within the engine 10. However, because combustor liners 17 are relatively large and complex parts, they may be particularly well suited for the methods and systems described herein for inspecting parts, and as such are referred to herein as an exemplary part for which the scanning fixture as described herein may be used for the purposes of a conducting a 3D scan of the part. Other parts of the engine 10 that can also be scanned using the scanning fixture and system as described herein include, but are not limited to, impellers, integrally bladed rotors, discs (e.g. of axial compressors or turbines), cases, fans and fan blades, etc.

Figure 3:
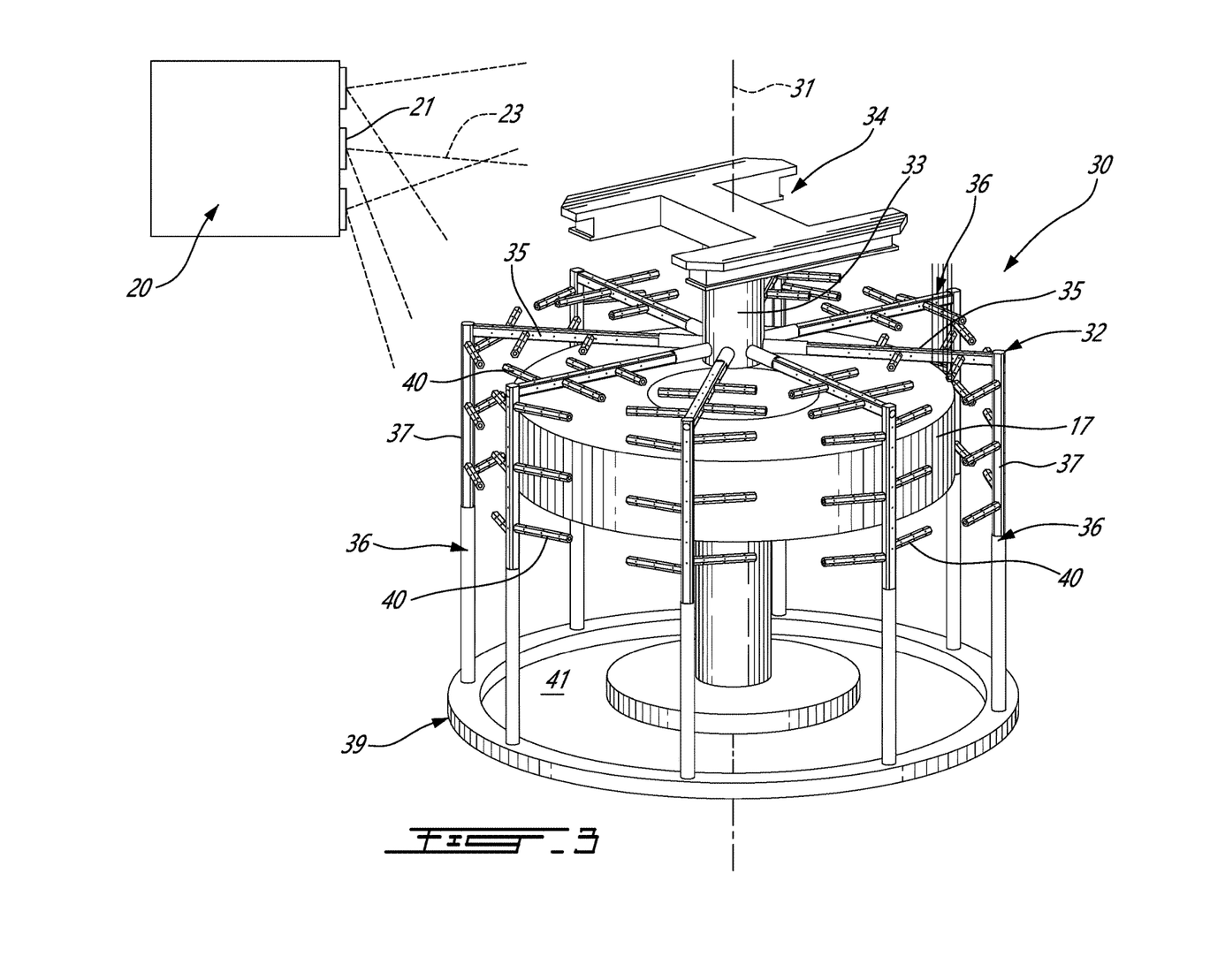
FIG. 3 is a perspective view of a removable fixture installed over a part to be scanned.

Referring now to FIG. 3, a scanning fixture 30 is depicted which is configured to be used as part of, or in conjunction with a three-dimensional (3D) scanning system 20 capable of scanning an object (in this case, the aircraft engine part) for measurement and/or digitization purposes. The 3D scanning system (or simply "3D scanner") 20 may be an optical system which includes at least one topometric system 21. The 3D scanner may be for example a topometric or bluelight type scanner.

The topometric sensor(s) 21 of the 3D scanning system 20 are used to acquire actual digitized points (e.g., point clouds) that define the surfaces of the part being scanned, and a compensation or transformation of the collected scan data is performed to produce compensated part data that more accurately reflects the surfaces of the part. Traditionally, laser line scanners are used to acquire part surfaces, but the line scanner uses laser triangulation that requires either a laser tracker or a specially designed process to address different size parts. However, the topometric sensors 21 of the 3D scanning system 20 do not require tracking systems, and instead use reference targets, or markers 50 as will be described in further detail below, as fixed references (visible in each scan taken from different positions) thereby permitting the transformation of the scanning shots taken by the topometric sensor 21 at different scanner positions.

The scanning fixture 30 is said to be an "adaptive fixture", in that it can be used adapted for repeated use and/or for a number of different parts. The adaptive scanning fixture 30 facilitates in process data acquisition using the 3D scanning system 20 and performing part position and orientation compensation.

Typical CNC machine tools equipped with a touch trigger probe can be used to locate and orient the part in the Machine Coordinate System (MCS) or Work Piece Coordinate System (WCS) which enables dynamic fixture offset compensation to produce geometrically accurate parts. However, for sheet metal parts that include perforated geometric features (such as combustor liners 17 have a plurality of effusion holes 19) the position and orientation of the part and/or of its apertures is not as straight forward to identify as typical mill-turn, milling, grinding, etc. machines. For example, a combustion liner 17 has thousands of effusion holes 19 drilled at different angles and diameters. Combustion liners 17 are made of sheet metals that deform significantly specially under heat during the Thermal Barrier Coating process. Hence, it is extremely important to know local deformation of the surface for each effusion hole to obtain accurate position and drilling angle. Scanning such parts using the scanning fixture 30 and the 3D scanning system 20 as described herein can help alleviate such issues.

The scanning fixture 30 as described herein may be configured such as to accommodate any part size, shape and/or type that can be scanned by a topometric sensor 21 of the 3D scanning system 20. The scanning fixture 30 provides a removable support for the reference targets, or markers 50, which are identified by the topometric sensor(s) 21. The transformation of the scan data from two scanner positions, requires a minimum number of common reference targets visible from both positions. The scanning fixture 30 facilitates this, as will be described herein.

The scanning fixture 30 is movable, in that it is displaceable such as to be placed adjacent to (e.g. over top of) the part being scanned and then removed once the part has been scanned. The scanning fixture 30 is therefore sized to at least partially surround the part to be scanned (such as a combustion liner 17, as described above), and in certain embodiments the scanning fixture 30 is sized such as to fit overtop of (and fully surround) the part 17. In certain embodiments, the scanning fixture 30 does not touch the part being scanned, but is located in relatively close proximity thereto within the field of view 23 of the topometric sensor 21.

The scanning fixture 30 includes generally a frame 32 having a hub 33 (which may also be referred to herein as a center hub) defining a center axis 31 (i.e., of both the frame 32 and the scanning fixture 30) and a base 39 that is axially spaced apart from the center hub 33. As will be described in further detail below, the frame 32 also includes a plurality of branches 36, which extend between the base 39 and the hub 33 and surround or at least partially enclose an internal cavity 41 defined within the frame 32. The part 17 being scanned is received within this internal cavity 41 during the scanning process.

The scanning fixture 30 also includes a manipulation element 34 fixed to the center hub 33 at an upper end thereof. The manipulation element 34 is configured, in one particular embodiment, to be removably attached to a robotic arm capable of displacing the scanning fixture 30 and manipulating it. The manipulation element 34 provides a handling interface which enables the scanning fixture 30 to be manipulated in an automated machine setting using any type of automated handling system (e.g. serial industrial/collaborative robot, AGVs, AMRs, etc.). Alternately, the scanning fixture 30 may be manually displaced and manipulated, for example by a user or technician, such as to position the scanning fixture 30 over a part to be scanned. Regardless of how it is manipulated, the scanning fixture 30 is a movable structure that is displaced (either manually or by an automated/robotic process) such as to be positioned over, around or otherwise near, the part to be scanned.

The frame 32 of the scanning fixture 30 includes a plurality of branches 36 fixed to the central hub 33 at a lower end thereof, opposite the manipulation element 34. As will be described in further detail below, the branches 36 have a number of markers 50 thereon which can be identified and/or tracked by the 3D scanning system 20. In the depicted embodiment, the frame 32 forms a generally cylindrical shape and includes eight branches 36, with each of the branches 36 including a first portion 35 that projects outwardly from the center hub 33 and a second portion 37 extending from the first portion 35 to a base frame 39 upon which the scanning fixture 30 sits. More particularly, in the embodiment of FIG. 3 the first portions 35 of the branches 36 extend substantially radially outward from the center hub 33, relative to the center axis 31 of the scanning fixture 30, and the second portions 37 of the branches 36 extend substantially axially (which may be vertically) from remote ends of the first portions 35 to the base frame 39. In the present embodiment, the base frame 39 is an annular ring that has a circular outer perimeter, and each of the branches 36 may be substantially identical.

However, in alternate embodiments, different shapes and configurations of the branches 36 and/or the base frame 39 which form the frame 32 may be used. For example, in an alternate embodiment, the frame 32 may define a generally square or rectangular shape (rather than a cylindrical one as per the embodiment of FIG. 3), in which case the base frame 39 may be square or rectangular and the branches 36 are configured to form the square or rectangular frame structure. In another embodiment, the frame 32 may be substantially bell shaped, wherein the branches 36 may for example have a first (or upper) portion 35 and an lower portion 37, one or both of which are curved. The first, upper, portion 35 may however have a greater curvature than the lower portions, and in fact the lower portions 37 may be substantially axially extending while the upper portions 35 remain curved. In any of these embodiments, the first and second portions 35, 37 of the branches 36 can be either integrally formed of a single part (e.g., a single elongated bar that is formed with the desired shape) or may be separate components that are fixed together (i.e. they are permanently fastened, such as by welding for example, such that relative displacement between the first and second portions 35, 37 of the branches 36 is not possible). It will also be understood that the length and/or shape of all of the branches 36 may not be the same.

In certain embodiments, including the frame 32 of the scanning fixture 30 depicted in FIG. 3, each of the branches 36 includes a plurality of sub-branches 40 which project from one or more of the first and second portions 35, 37 of the branches 36. These sub-branches 40 project outwardly from the respective first and second portions 35, 37 on which they are mounted and extend transversely relative thereto. As seen in FIG. 3, pairs of sub-branches 40 are disposed at an angle relative to each longitudinally extending branch, such as to define the overall general shape of the frame 32. In this case, the frame 32 is generally cylindrical in shape, and thus the sub-branches 40 on the second portions 37 of the branches 36 project radially inwardly as the sub-branches 40 extend away from the main body of the portions 37. The sub-branches 40 on the first portions 35 of the branches 36 extend in a plane that is substantially perpendicular to the center axis 31, the first portions 35 also lying in this plane.

As mentioned above, the frame 32 of the of the scanning fixture 30 includes a plurality of markers 50 whose exact position in three-dimensional space can be identified and tracked by the 3D scanning system 20. The markers 50 may be optical markers which are capable of being identified by the topometric sensors 21 or other suitable sensors of the 3D scanning system 20, such that the 3D scanning system 20 is capable of detecting spatial coordinates of each of the markers 50 in space. In certain embodiments, the markers 50 are passive optical markers, in that they do not emit light but rather are optically located within the scanned images taken by the sensor(s) of the 3D scanning system such that the 3D scanning system is capable of determined the spatial coordinates of these markers 50 in three-dimensional space. Regardless of the marker type, the detected spatial coordinates of the markers 50 provide the 3D scanning system 20 with a series of reference points (i.e., digitization reference points) that are located in a fixed position in space relative to the part during the scanning process (once the frame 32 is positioned in place, adjacent, over, around and/or otherwise near the part being scanned). During the scanning process, the 3D scanning system 20 records the spatial position of each of these markers 50, which define digitization reference points (or simply "reference points"), and the system designates an identifier (for example a specific number). Upon completing one scan, these digitization reference points can be saved in the system and used, by re-importing, for the next scanning. These digitization reference points are used to transform different scans, in order to create the digitized part (i.e., a digital model of part). The scanning program performed by the 3D scanning system 20 is done such that that, between scans there are a given number of reference points that remain fixed and common between the scans, and these digitization reference points are used to perform the transformation (i.e., a compensation of the data acquire from each scan such that the resultant digital model created by the 3D scanning system 20 is as accurate as possible).

The markers 50 on the scanning fixture 30 may include, in one embodiment for example, white or light colored markers on a high contrast dark background. The quality of the transformation performed by the 3D scanning system 20 defines the quality of compensation and inspection of part being scanned (e.g., combustor liner 17). The scanning fixture 30 ensures the quantity of the reference targets (the markers 50) required for best possible transformation of scans at different positions in the working volume to thereby ensure high quality compensation and inspection. A large number of reference targets provided by the markers 50 of the scanning fixture 30 (which remain in a fixed position in space throughout the scanning process and thus provide fixed references) are common in each of the scans performed (e.g., scans performed with the topometric sensor 21 at different sensor positions). This ensures accuracy of the transformation and thus accuracy of the scan performed. The present scanning fixture 30 is therefore very helpful for ensuring accurate scans of parts with very tight tolerances and/or which are very complex.

Accordingly, the frame 32 ensures that a plurality of the markers 50 are located relatively close to the surfaces of the part to be scanned (but without the frame 32 touching the part), such that the topometric sensor(s) 21 of the 3D scanning system 20 is/are capable of "seeing" (e.g., identifying their precise locations in space) both the part being scanned and these markers 50 within a field of view 23 of the 3D scanning system 20 (which may also be a field of view and/or a focus range of the topometric sensor 21).

Figure 4:
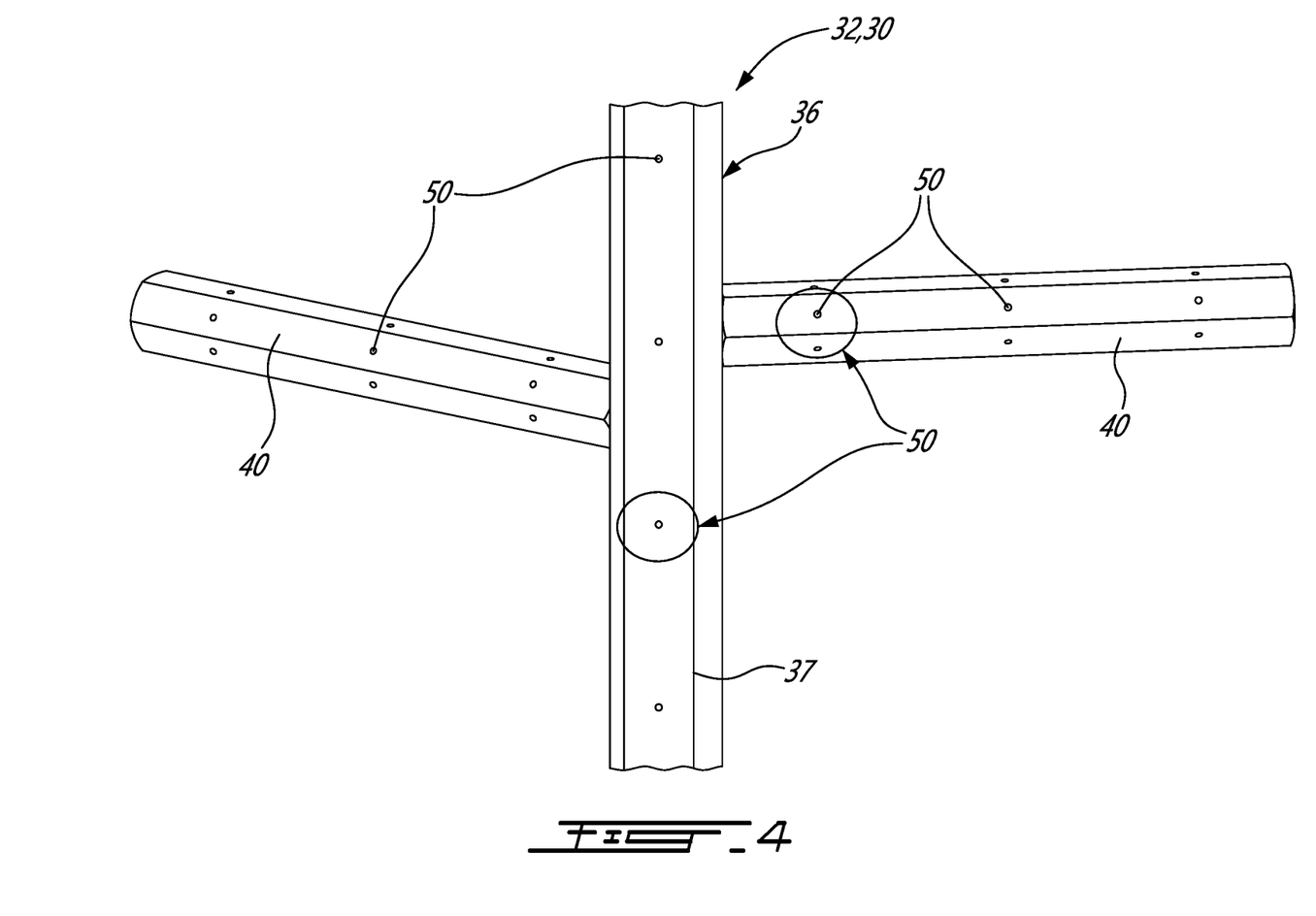
FIG. 4 is a detailed view of a portion of the removable fixture of FIG. 3.

These markers 50, which may also be referred to as "targets", are located in fixed positions at fixed locations on the frame 32. As seen in FIG. 4, which show close-up of a portion of one of the branches 36 of the frame 32, the second portion 37 of the branch 36 includes a number (four are shown) of markers 50 in a surface thereof, facing an outward direction, and the sub-branches 40 extending from the second portion 37 of the branch 36 also include a number (three, in this case) of markers 50 on a surface thereof. In the depicted embodiment, the markers 50 are substantially equally spaced apart, both along the vertically-extending second portion 37 of the branch 36 and along the transversely extending sub-branch 40. However, in other embodiments it may also be possible to provide markers 50 at irregular intervals, or having non-constant spacing between pairs of the markers 50. Regardless, the markers 50 are disposed on one or more surfaces of the components making up the frame 32, in such a manner that these markers 50 are "visible" to the topometric sensor(s) 21 of the 3D scanning system 20.

Once the topometric sensor(s) 21 of the 3D scanning system 20 has performed a 3D scan of the part 17 and the surrounding scanning fixture 30, the scanning fixture 30 can be removed. The 3D scanning system 20 is then able to generate a precise digital image of the part 17, based on a cloud of points, with the markers 50 of the scanning fixture 30 providing the necessary reference points in space.

The movable scanning fixture 30 thus permits rapid and repeatable 3D scanning of parts using a topometric sensor 21 and associated 3D scanning system 20, without needing to apply any reference targets to the part or parts themselves. This is because the reference targets, namely the markers 50, are located on the removable scanning fixture 30 which is positioned in fixed position relative to part during the scanning process, and then the scanning fixture 30 is removed once scanning is complete. Additionally, the scanning fixture 30 is readily moveable and does not need to be fixed or fastened in place, such as to a table or supporting substrate, while still ensuring scanning accuracy. Consequently, the speed and throughput of the scanning process may be increased. This makes easy and quick target creation possible, and permits a scanning process and system that is adapted to large parts (e.g., combustor liners 17, for example) of aircraft engines 10.

Additionally, one scanning fixture 30 can be used during the scanning of multiple parts simultaneously. For example, if the scanning fixture 30 is sufficiently large to fit overtop of multiple parts at once, a single scanning process by the 3D scanning system 20 can be performed, whereby the multiple parts can be digitized and the single fixture 30 provides the necessary reference for each of the parts that are scanned. For example, multiple combustor liner 17 may be scanned at once using the same removable scanning fixture 30.

Figure 5:
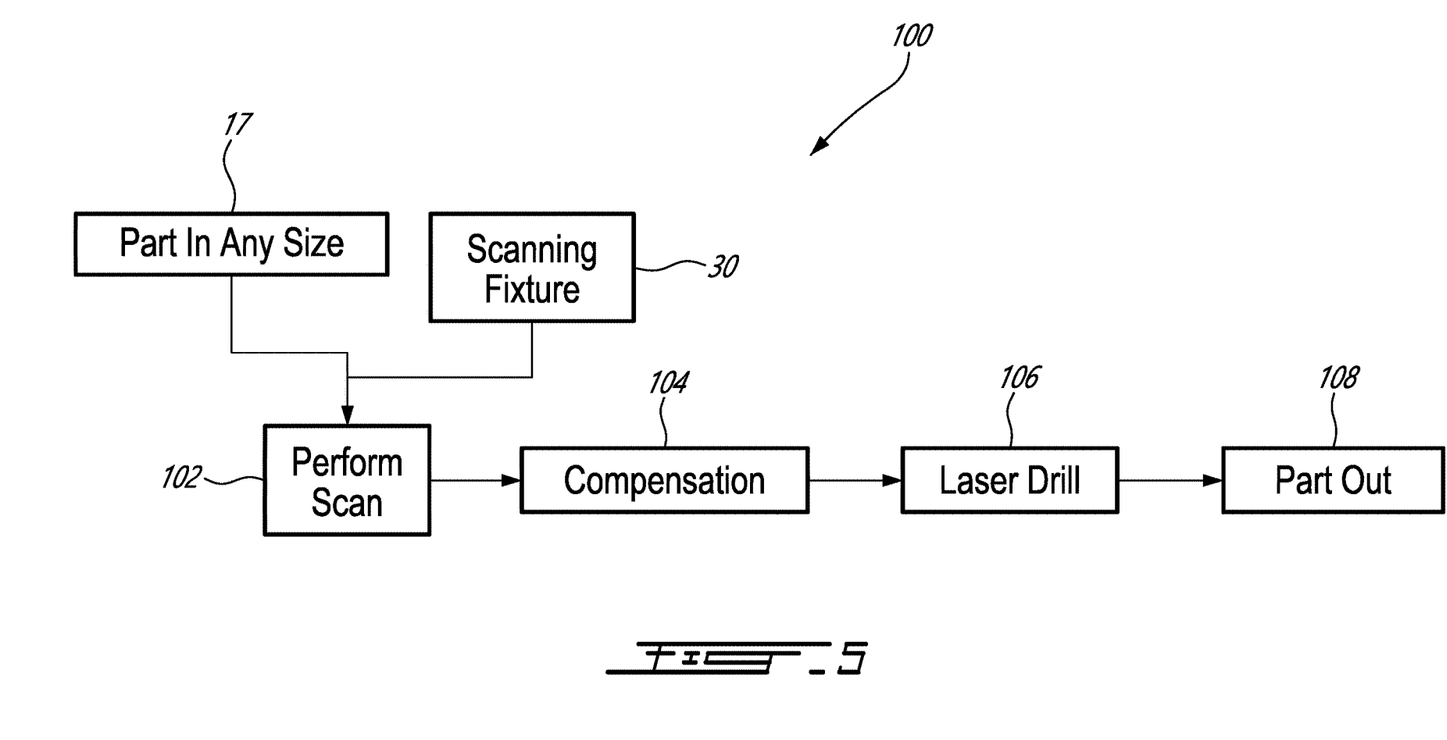
FIG. 5 is a flow chart of a method of manufacturing a part using a 3D scanning system and the scanning fixture of FIG. 3.

Referring now to FIG. 5, a flow chart schematically depicting a method 100 of manufacturing a complex part, such as a combustor liner 17, using the 3D scanning system 20 and the scanning fixture 30 "in line" within the manufacturing process is shown. In the past, this process has typically first required several preliminary steps, such as determining the part size, calibrating reference points, calibrating a scanning volume, etc. before being able to perform the scan. In contrast, the method 100 of the present disclosure is both simplified and optimized. The method 100 of manufacturing a combustor liner 17 that requires precise laser drilling of cooling apertures 19 (e.g., effusion holes) is depicted. The method 100 includes providing the scanning fixture 30 and the part 17—regardless of size (e.g. the combustor liner 17)—regardless of its size—and, at 102, performing the topometric scan using the 3D scanning system 20, which may in certain embodiments include taking multiple scanning shots with the topometric sensor 21 at different scanner positions. This generates, or allows the system 20 to acquire, scanned part data. At step 104, the compensation or transformation of the scanned part data acquired by the scanning shots is performed, such as to generate compensated part data which more accurately reflects the surfaces of the scanned part. This compensated scanned part data can be used, for example, to generate a accurate digital model of the part (e.g., the combustor liner 17). The scanning fixture 30 can be removed, either after performing the scan at 102 or after performing the compensation at 104. The actual machining of the combustor liner 17, which may include laser drilling of the effusion holes and other cooling apertures 19 in the combustor liner 17, can then occur at step 106. The machined combustor liner 17 is then completed and the part can be moved on, at step 108, to suitable next steps of the manufacturing process.

The method 100 disclosed reduces the time required for part position and orientation, compensation and inspection, and may thus enhance the overall quality of the part. In certain embodiments, full automation may be achieved by using the topometric scanning sensors 21 with the removable scanning fixture 30. The present process can be scaled to fit any geometry of large parts. Such adaptive fixturing, using the scanning fixture 30 as defined herein, can permit the scanning process to be fully automated, and enables higher quality data transformation hence high accuracy laser drilling and little to no maintenance.

Figure 6:
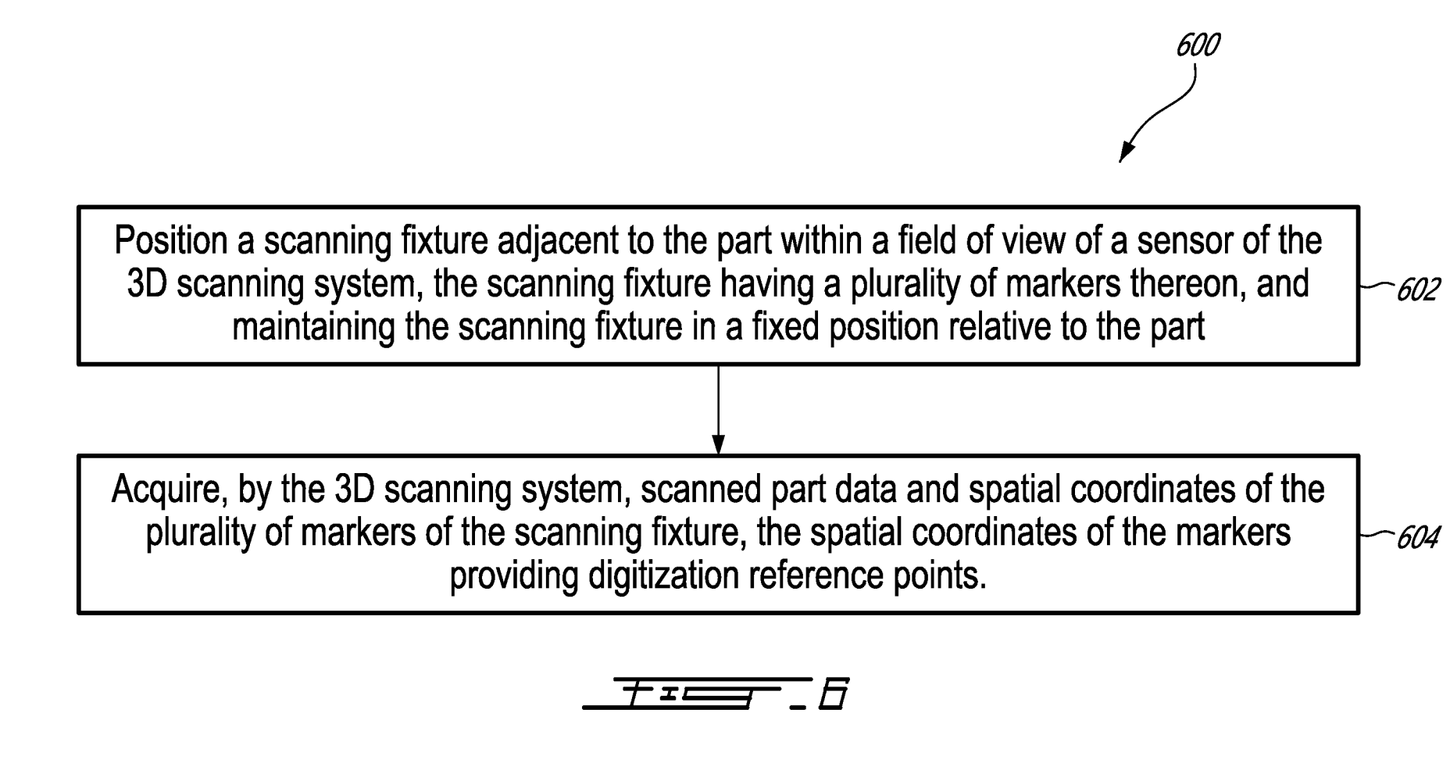
FIG. 6 is a flow chart of a method of scanning a part using a three-dimensional (3D) scanning system as described herein.

Referring now to the flowchart of FIG. 6, a method 600 of scanning a part, such as a part of an aircraft engine 10 for example, using a three-dimensional (3D) scanning system 20, is schematically depicted. The method 600 includes, at step 602, positioning a scanning fixture adjacent to the part within a field of view of a sensor of the 3D scanning system, the scanning fixture having a plurality of markers thereon. Although the scanning fixture is displaceable, as described above, the scanning fixture is maintained in a fixed position relative to the part during the scanning process. The method 600 further includes, at step 604, acquiring, by the 3D scanning system 20, scanned part data and spatial coordinates of the plurality of markers 50 of the scanning fixture 30, the spatial coordinates of the markers providing digitization reference points.

The method 600 may further include performing a compensation or transformation of the scanned part data, using the digitization reference points, to generate compensated part data. A digital bone model of the part may also be generated, by the 3D scanning system, using the compensated part data. The step 604 of acquiring may further include scanning the part, and the scanning fixture, from two or more sensor locations.

The method 600 may further include displacing the scanning fixture from a first position to a second position located within a field of view of the sensor of the 3D scanning system, the scanning fixture being located adjacent the part in the second position. In certain embodiments, the scanning feature at least partially surrounds the part in the second position. The scanning fixture may includes a frame defining an internal cavity, and the method may include positioning the frame such that the part is located within the internal cavity when in the second position.

In certain aspects, the plurality of markers are located on multiple branches of a frame of the scanning fixture, the branches defining an internal cavity of scanning fixture. The method may accordingly further include placing the frame over the part to position the part within the internal cavity.

The method 600 may also include, following the acquiring, displacing the scanning fixture away from an initial position of the scanning fixture relative the part, and removing the part from the field of view of the 3D scanning system. In certain cases, another part is then placed within the field of view of the 3D scanning system and repositioning the scanning fixture in the initial position.

Figure 7:
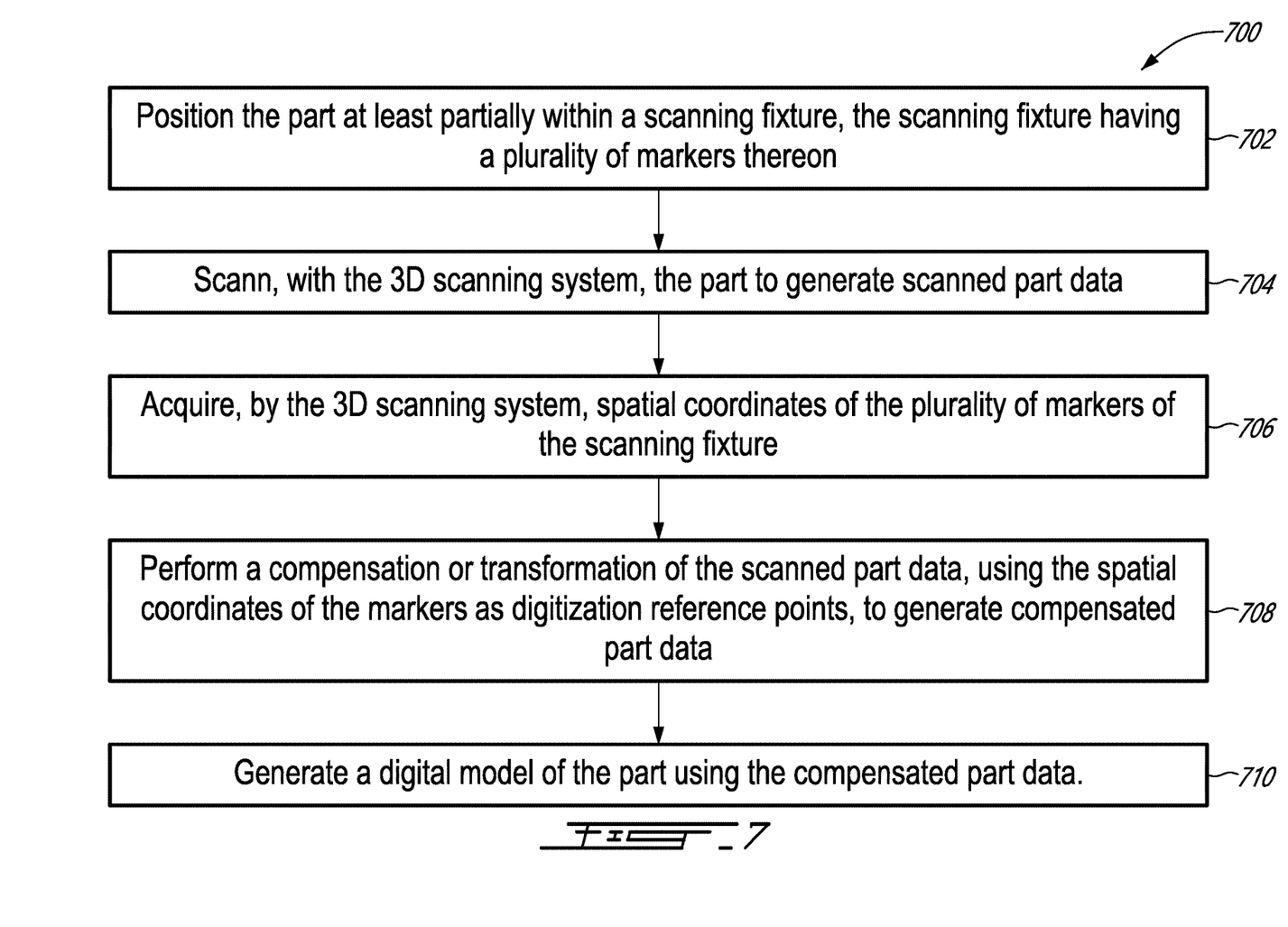
FIG. 7 is a flow chart of another method of scanning a part using a three-dimensional (3D) scanning system as described herein.

Referring now to the flowchart of FIG. 7, a method 700 of scanning a part, such as a part of an aircraft engine 10 for example, using a three-dimensional (3D) scanning system 20, is schematically depicted. The method 700 includes, at step 702, positioning the part at least partially within a scanning fixture, wherein the scanning fixture has a plurality of markers thereon. Then, at step 702, the method 700 includes scanning, with the 3D scanning system 20, the part to generate scanned part data. At step 706, spatial coordinates of the plurality of markers of the scanning fixture are acquired, by the 3D scanning system 20. At step 708, a compensation or transformation of the scanned part data is performed, using the spatial coordinates of the markers as digitization reference points, to generate compensated part data. Finally, at step 710, a digital mode of the part is generated using the compensated part data.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of scanning a part using a three-dimensional (3D) scanning system. The method also includes positioning a scanning fixture adjacent to the part within a field of view of a sensor of the 3D scanning system, the scanning fixture having a plurality of markers thereon, and maintaining the scanning fixture in a fixed position relative to the part; and acquiring, by the 3D scanning system, scanned part data and spatial coordinates of the plurality of markers of the scanning fixture, the spatial coordinates of the markers providing digitization reference points. Other embodiments of this aspect include corresponding computer systems, apparatus, and computer programs recorded on one or more computer storage devices, each configured to perform the actions of the methods.

Implementations may include one or more of the following features. The method may include performing a compensation or transformation of the scanned part data, using the digitization reference points, to generate compensated part data. The method may include generating a digital model of the part using the compensated part data. The acquiring further may include scanning the part and the scanning fixture from two or more sensor locations. The method may include displacing the scanning fixture from a first position to a second position located within a field of view of the sensor of the 3D scanning system, the scanning fixture being located adjacent the part in the second position. The scanning feature at least partially surrounds the part in the second position. The scanning fixture includes a frame defining an internal cavity, may include positioning the frame such that the part is located within the internal cavity when in the second position. The plurality of markers are located on multiple branches of a frame of the scanning fixture, the branches defining therewithin an internal cavity of scanning fixture, may include placing the frame over the part to position the part within the internal cavity. The method may include, following the acquiring, displacing the scanning fixture away from an initial position of the scanning fixture relative the part, and removing the part from the field of view of the 3D scanning system. The method may include placing another part within the field of view of the 3D scanning system and repositioning the scanning fixture in the initial position. Implementations of the described techniques may include hardware, a method or process, or computer software on a computer-accessible medium.

One general aspect includes a method of scanning a part of an aircraft engine using a three-dimensional (3D) scanning system. The method also includes positioning the part at least partially within a scanning fixture, the scanning fixture having a plurality of markers thereon; scanning, with the 3D scanning system, the part to generate scanned part data; acquiring, by the 3D scanning system, spatial coordinates of the plurality of markers of the scanning fixture; performing a compensation or transformation of the scanned part data, using the spatial coordinates of the markers as digitization reference points, to generate compensated part data; and generating a digital model of the part using the compensated part data. Other embodiments of this aspect include corresponding computer systems, apparatus, and computer programs recorded on one or more computer storage devices, each configured to perform the actions of the methods.

Implementations may include one or more of the following features. The method where the scanning and the acquiring are performed simultaneously. The positioning the part further may include displacing the scanning fixture and positioning the scanning fixture adjacent to the part within a field of view of a sensor of the 3D scanning system. The acquiring further may include scanning the part and the scanning fixture from two or more sensor locations. Implementations of the described techniques may include hardware, a method or process, or computer software on a computer-accessible medium.

One general aspect includes a three-dimensional (3D) scanning system for scanning a part. The three-dimensional also includes a sensor defining a field of view of the 3D scanning system; and a scanning fixture that is displaceable and sized to at least partially surround the part within the field of view, the scanning fixture including: a frame having a base, a center hub axially spaced apart from the base and defining a center axis of the scanning fixture, and a plurality of branches extending between the base and the center hub, the braches defining an internal cavity defined within the frame, the internal cavity being sized to receive the part; and a plurality of markers located on the frame, the markers being identified by the sensor to determine spatial coordinates of the markers. Other embodiments of this aspect include corresponding computer systems, apparatus, and computer programs recorded on one or more computer storage devices, each configured to perform the actions of the methods.

Implementations may include one or more of the following features. The scanning fixture where a manipulation element is attached to the frame, the manipulation element permitting displacement of the scanning fixture. The markers are disposed on the branches of the frame facing an outward direction. The markers are substantially equally spaced apart along at least a portion the branches of the frame. The frame includes sub-branches extending transversely from the branches, the sub-branches disposed at an angle relative to a respective longitudinally extending branch. The markers are passive optical markers. Implementations of the described techniques may include hardware, a method or process, or computer software on a computer-accessible medium.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of scanning a part using a three-dimensional (3D) scanning system, the method comprising:
    positioning a scanning fixture in an initial position relative and adjacent to the part within a field of view of a sensor of the 3D scanning system, the scanning fixture having a plurality of markers thereon, and maintaining the scanning fixture in a fixed position relative to the part; and
    acquiring, by the 3D scanning system, scanned part data and spatial coordinates of the plurality of markers of the scanning fixture, the spatial coordinates of the markers providing digitization reference points; and
    performing a compensation or transformation of the scanned part data, using the digitization reference points, to generate compensated part data; and
    following the acquiring, displacing the scanning fixture away from the initial position of the scanning fixture relative the part, and removing the part from the field of view of the 3D scanning system.

2. The method of claim 1, further comprising generating a digital model of the part using the compensated part data.

3. The method of claim 1, wherein the acquiring further comprises scanning the part and the scanning fixture from two or more sensor locations.

4. The method of claim 1, further comprising displacing the scanning fixture from a first position to a second position located within a field of view of the sensor of the 3D scanning system, the scanning fixture being located adjacent the part in the second position.

5. The method of claim 4, wherein the scanning fixture at least partially surrounds the part in the second position.

6. The method of claim 5, wherein the scanning fixture includes a frame defining an internal cavity, further comprising positioning the frame such that the part is located within the internal cavity when in the second position.

7. The method of claim 1, wherein the plurality of markers are located on multiple branches of a frame of the scanning fixture, the branches defining therewithin an internal cavity of the scanning fixture, further comprising placing the frame over the part to position the part within the internal cavity.

8. The method of claim 1, further comprising placing another part within the field of view of the 3D scanning system and repositioning the scanning fixture in the initial position.

9. A method of scanning a part of an aircraft engine using a three-dimensional (3D) scanning system, the method comprising:
    positioning the part at least partially within a scanning fixture located in an initial position relative to the part, the scanning fixture having a plurality of markers thereon;
    scanning, with the 3D scanning system, the part to generate scanned part data;
    acquiring, by the 3D scanning system, spatial coordinates of the plurality of markers of the scanning fixture;
    performing a compensation or transformation of the scanned part data, using the spatial coordinates of the markers as digitization reference points, to generate compensated part data, and generating a digital model of the part using the compensated part data; and following the acquiring, displacing the scanning fixture away from the initial position, and removing the part from the field of view of the 3D scanning system.

10. The method of claim 9, wherein the scanning and the acquiring are performed simultaneously.

11. The method of claim 9, wherein the positioning the part further comprises displacing the scanning fixture and positioning the scanning fixture adjacent to the part within a field of view of a sensor of the 3D scanning system.

12. The method of claim 9, wherein the acquiring further comprises scanning the part and the scanning fixture from two or more sensor locations.

13. The method of claim 9, wherein the plurality of markers are located on multiple branches of a frame of the scanning fixture, the branches defining therewithin an internal cavity of scanning fixture, further comprising placing the frame over the part to position the part within the internal cavity.

14. A three-dimensional (3D) scanning system for scanning a part, comprising:
 a sensor defining a field of view of the 3D scanning system; and
 a scanning fixture that is displaceable and sized to at least partially surround the part within the field of view, the scanning fixture including:
  a frame having a base, a center hub axially spaced apart from the base and defining a center axis of the scanning fixture, and a plurality of branches extending between the base and the center hub, the branches defining an internal cavity defined within the frame, the internal cavity being sized to receive the part; and
  a plurality of markers located on the frame, the markers being identified by the sensor to determine spatial coordinates of the markers.

15. The scanning fixture of claim 14, wherein a manipulation element is attached to the frame, the manipulation element permitting displacement of the scanning fixture.

16. The scanning fixture of claim 14, wherein the markers are disposed on the branches of the frame facing an outward direction.

17. The scanning fixture of claim 14, wherein the markers are substantially equally spaced apart along at least a portion the branches of the frame.

18. The scanning fixture of claim 14, wherein the frame includes sub-branches extending transversely from the branches, the sub-branches disposed at an angle relative to a respective longitudinally extending branch.

19. The scanning fixture of claim 14, wherein the markers are passive optical markers.

* * * * *